United States Patent

[11] 3,561,690

| [72] | Inventor | Kurt Muskat |
| | | Hamburg, Germany |
| [21] | Appl. No. | 783,690 |
| [22] | Filed | Dec. 13, 1968 |
| [45] | Patented | Feb. 9, 1971 |
| [73] | Assignee | Klippan GmbH |
| | | Hamburg-Garstedt, Germany |
| [32] | Priority | Dec. 15, 1967 |
| [33] | | Germany |
| [31] | | P 15 31 524.9 |

[54] PLASTICALLY DEFORMABLE DAMPING MEMBER FOR MOTOR VEHICLE SAFETY BELTS
14 Claims, 6 Drawing Figs.

[52] U.S. Cl. .................................................. 242/54,
242/75.4, 242/156; 280/150; 297/386
[51] Int. Cl. ....................................................... B65h 75/00,
B65h 59/00
[50] Field of Search........................................... 242/54,
107, 107SB, 107.4, 107.5, 107.6, 99, 153, 75.4,
156; 297/385, 386, 388; 267/10; 188/1;
280/150SB

[56] References Cited
UNITED STATES PATENTS

| 2,861,627 | 11/1958 | Smith.............................. | 280/150X |
| 2,953,189 | 9/1960 | Barash............................ | 297/386UX |
| 2,953,315 | 9/1960 | Lautier et al. ................. | 242/107.4 |
| 3,232,383 | 2/1966 | Moberg.......................... | 297/386X |
| 3,442,466 | 5/1969 | Fritsche.......................... | 242/107.4 |

*Primary Examiner*—Stanley N. Gilreath
*Assistant Examiner*—Werner H. Schroeder
*Attorney*—Lowry, Rinehart & Markva ABSTRACT: An energy absorbing device for motor vehicle safety belts comprises a plastically deformable damping member. The damping member is in the form of at least one coil of metal tape one end of which is secured to a rotatable shaft about which a length of belt is wound. The fixed reaction member is so located relative to the coil and shaft that the withdrawal of the length of belt from the shaft as the result of a collision causes the shaft to rotate and the fixed reaction member to deform the tape as it is drawn past the reaction member from the coil and is wound onto the rotatable shaft.

PATENTED FEB 9 1971 3,561,690

Inventor:
KURT MUSKAT

Lowry, Rinehart & Mackiw 3,561,690

Inventor:
KURT MUSKAT

Lowry, Rinehart & Marbin

PLASTICALLY DEFORMABLE DAMPING MEMBER FOR MOTOR VEHICLE SAFETY BELTS

BACKGROUND OF THE INVENTION

This invention relates to an energy absorbing device for motor vehicle safety belts which includes a plastically deformable damping member in the form of at least one metal tape withdrawable from a storage coil and deformable by a fixed reaction member when the safety belt is pulled in a collision.

Safety belts for motor vehicles may be of the type which are plastically and/or elastically deformed by the momentum of the wearer when there is an accident. Elastic elongation of a safety belt is not desirable because the elastic rebound of the wearer after sudden elongation of the belt may cause fracture of the cervical vertebrae. On the other hand, plastic deformation of the belt dampens the forward jerk upon impact. However, belt materials which will permit plastic deformation are limited and not entirely satisfactory in other respects. It has therefore been proposed to provide the belt with a supplementary damping member.

If the elongation of the safety belt and of its damping member is represented in the form of a curve by plotting the reactive pulling force on the ordinate over the elongation of the abscissa, conventional damping members produce a roughly linear elongation curve. The characteristic reaction curve of a belt is considerably steeper.

The maximum reactive pull which the wearer can endure is thus reached after a fairly short elongation and further elongation of the belt would generate a greater reactive pull that is likely to cause injury to the wearer. Hence only a small proportion of the momentum can be destroyed if the load on the belt is not to exceed the pull the wearer can endure without suffering injury. Although conventional damping members are capable of damping an impact that may occur for instance when vehicles collide at a speed of something over 30 m.p.h., they are unable to destroy the kinetic energy released by a collision at say 50 m.p.h. without grave risk of the wearer being badly injured.

In order to cope with major momenta it has previously been proposed to pull the free end of a steel tape wound up in the form of a coil of inwardly increasing width resting on a reaction member, through a relatively narrow slot in the reaction member and to attach it to the belt. The purpose of this arrangement is to destroy kinetic energy by the continuous deformation of the tape as it is pulled off its coil as the safety belt is pulled away. However, for a given material, the deformation work in this kind of damping member can be increased only by increasing the tape cross section, since the distance the tape can be withdrawn is limited by the available space inside the vehicle. However, any increase in section has the undesirable consequence of increasing the resultant deceleration. Moreover, the spatial dimensions become less satisfactory.

SUMMARY OF THE INVENTION

It is the object of the present invention to provide an energy absorbing device for motor vehicle safety belts which is compact and will produce an optimum deceleration while absorbing a maximum amount of energy by deforming a plastically deformable damping member.

To attain this object the present invention provides a plastically deformable damping member for motor vehicle safety belts, in the form of at least one metal tape withdrawable from a storage coil and continuously deformable by a fixed reaction member when the safety belt is pulled from a shaft upon which it is wound, the end of the metal tape being so connected to said shaft that withdrawal of a length of belt from the shaft causes the metal tape to wind onto the shaft.

The winding up of the metal tape involves the performance of additional work of deformation. Furthermore, the special advantage is gained that after having been pulled out the damping member will not project into the vehicle interior where it could cause injury to other passengers who are thrown inside the vehicle, but the damping member in its entirety remains inside a special casing which may be bolted to the vehicle wall over or under the trim or to the vehicle floor.

The shape of the above-mentioned characteristic curve can be adapted to practical requirements by a suitable choice of the metal cross section of the tape. The invention also offers the possibility of providing an arching characteristic curve by varying the cross-sectional area of the tape along its length, more particularly by continuously reducing the thickness or width of the tape towards the inner end of the coil, thereby to generate an arched characteristic that matches the arcuately descending compatibility curve plotted in a coordinate system in which the abscissa is the time axis and the ordinate the axis indicating the reactive pull of the belt.

The possible magnitude of the energy that can thus be destroyed by using a relatively small damping member is particularly great if the tape is taken from its storage coil to the shaft over a reaction member in such a way that the tape unwinds from its storage coil in one direction and winds up on the shaft for the belt in the other direction, since in such an arrangement the tape is twice deflected and flexed when it is withdrawn and rewound.

It has further proved to be an advantage to locate the reaction member in a position offset from the plane containing the axes of rotation of the storage coil and of the shaft. This gives rise to a relatively sharp deflection of the tape around the reaction member accompanied by increased friction which can be overcome only by a major pulling force.

According to another feature of the invention it is proposed to locate the reaction member at a distance from the shaft, so chosen that the coil of tape that winds up on the shaft will make contact with the reaction member before the tape is completely withdrawn from its storage coil. This arrangement prevents the generation of a sudden jerk in the extending belt because the rubbing friction between the reaction member and the coil of tape on the shaft brakes the shaft before the tape has completely unwound from its storage coil and before it can be fully wound up on the shaft.

Any one-sided load imposed on the shaft by the damping member or the deforming tape in the event of an accident can be avoided by providing two or more coils of tape, all the tapes being taken over a common reaction member and anchored to a common shaft. In this arrangement the coiled tapes, the reaction member and the shaft are conveniently all mounted in a chassis provided with locating walls for the coils of tape. These locating walls will then prevent the tape from pulling out of alignment. Without special means satisfactory location can be achieved for instance by providing a U-section chassis, i.e. a chassis having two sidewalls and containing one coil of tape adjacent each wall, the end of the safety belt being wound on the shaft between the two tapes. Preferably the safety belt is wound on the shaft in one direction and the tapes in the other direction, so that the tapes will wind on when the belt is withdrawn.

Moreover, it is preferred also to provide locating walls on the insides of the two coils of tape, each such wall being formed by one flange of a U-shaped bracket which may be an insertion or integral with the chassis. The storage coils of tape need not then be mounted on special shafts.

In order to reduce the height of the outside casing without unduly reducing the space available for the winding of the tape or tapes on the shaft, the base of the chassis may be formed with an opening below the shaft.

The overall size of the casing can be further reduced if the end of the belt that winds on and off the shaft is represented by a steel rope or wire which in width requires much less space than the relatively wide belt itself. In such an arrangement the end of the steel rope or wire that winds on and off the shaft may be provided with an eyelet attached to the end of the relatively wide safety belt in the form of a textile webbing, preferably by detachable fastening means.

BRIEF DESCRIPTION OF THE DRAWINGS

Two embodiments of the invention will now be described by way of example and with reference to the accompanying drawings in which.

DESCRIPTION OF THE PREFERRED EMBODIMENTS

Figure 1:
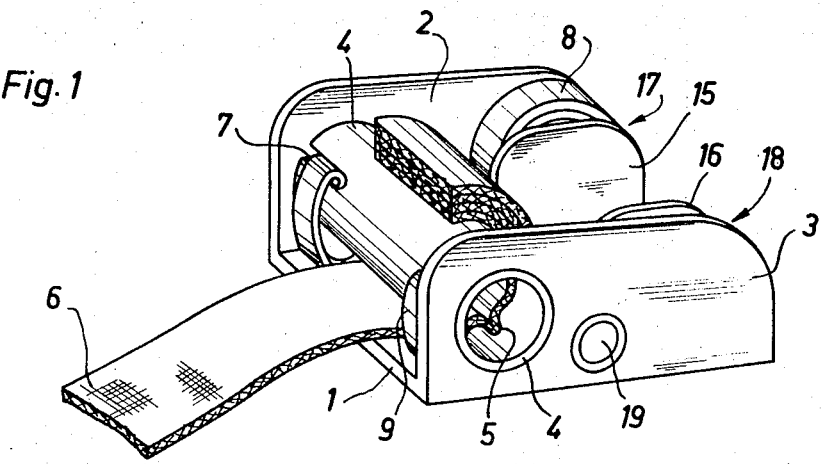
FIG. 1 is a perspective view of a plastically deformable damping member for safety belts according to the invention.
Figure 2:
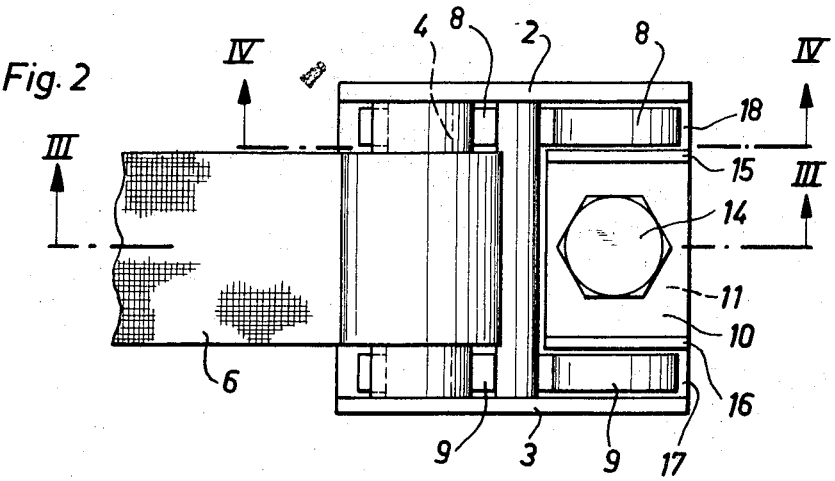
FIG. 2 is a plan view of the damping member according to FIG. 1.
Figure 3:
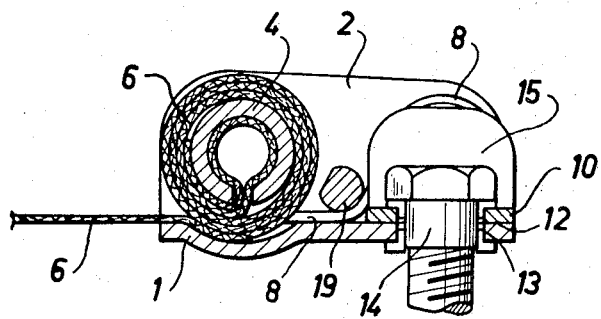
FIG. 3 is a section of the damping member taken on the line III-III of FIG. 2.

The damping member illustrated in FIGS. 1 to 5 has a U-shaped sheet steel chassis 1 having sidewalls 2 and 3. Rotatably mounted at one end of this chassis between the two sidewalls 2 and 3 is a hollow shaft 4 of which the center section has an axial slot 5 for anchoring the end of a rolled up length of safety belt 6, whereas the ends of two metal tapes 8 and 9 engage further slots 7 at the ends of the shaft 4.

The other end of the chassis 1 contains a U-shaped bracket 10 (FIGS. 2 and 3) provided with a hole 12 in its floor 11, said hole aligning with a hole 13 in the base of the chassis 1. A bolt 14 passes through the two holes 12 and 13 and serves for securing the chassis 1 and its associated parts to the floor of a vehicle body.

Figure 4:
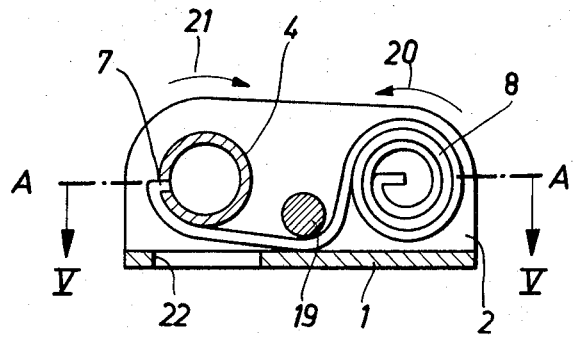
FIG. 4 is a section of the damping member taken on the line IV-IV of FIG. 2.
Figure 5:
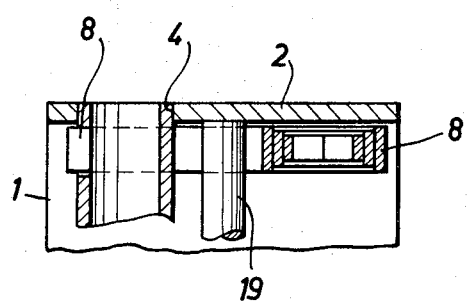
FIG. 5 is a section of the damping member taken on the line V-V of FIG. 4.

The two flanges 15 and 16 of the bracket 10 which extend parallel to the sidewalls 2 and 3 of the chassis 1 each define a chamber 17 or 18, respectively between the flange and the neighboring sidewall for the accommodation therein of one of the coils of the metal tapes 8 and 9. As shown in FIG. 4 the arrangement is such that the centers, i.e. the axes of rotation of the shaft 4 and of the two metal tapes 8 and 9 are all at the same level A—A extending above, and parallel to, the base of the chassis 1. Below this level A—A a bar-shaped reaction member 19 extends across the chassis from the sidewall 2 to the sidewall 3.

The two metal tapes 8 and 9 are wound up anticlockwise as indicated by the arrow 20 in FIG. 4, each forming a coil, the tape from each coil running under the reaction member 19 and onto the shaft 4 into its corresponding slot 7 and rewinding in the clockwise direction, as indicated by the arrow 21. However, the safety belt 6 is wound on the shaft 4 between the two metal tapes 8 and 9 in the opposite, viz. anticlockwise direction.

Consequently, a pull on the belt 6 withdrawing the same from the shaft 4 will have the effect of turning the shaft 4 and of winding the tapes 8 and 9 onto the shaft. This action is accompanied by the continuous deformation of the two metal tapes around the reaction member 19, and this operates continuously to consume and eventually to destroy the momentum of the body of the wearer and to maintain a constant reactive pull of the belt 6. When the reactive pull exceeds a given magnitude it can be made to decrease by so designing the tapes 8 and 9 that their width continuously diminishes, as will be understood from FIG. 5.

The damping member in FIGS. 1 to 5 is so designed that the metal tapes 8 and 9 cannot be completely wound up on the shaft 4 and thereby cause a sudden increase in the resistance offered by the belt, even if the pulling load further increases. This is ensured by suitably selecting the distance between the reaction member 19 and the shaft 4. This distance is so chosen that when the coils 8 and 9 have been nearly completely unwound, the diameter of the coils of tape on the shaft 4 has become large enough for the coils to make contact with the reaction member 19 which will therefore have a frictional braking effect, preventing any further increase in diameter of the coils of tap on the shaft 4.

It will also be understood from FIG. 4 that an opening 22 is formed in the base of the chassis 1 below the shaft 4. The presence of this opening 22 permits the distance between the shaft 4 and the bottom of the chassis to be reduced and the overall height of the damping member to be minimize, since the bottom of the chassis 1 will not obstruct the tapes as these run onto the shaft 4.

A number of variables must be taken into consideration when designing this damping device. In selecting a metal tape having the proper characteristics for absorbing the momentum energy, consideration must be given to a determination as to what is the accepted maximum deceleration rate which the human body can safely withstand, the diameter of the shaft 4, the location of the fixed reaction member 19 relative to the shaft and storage coil, the distance the belt can safely be extended during the absorption of energy without risk of the body striking a part of the vehicle, etc. Once these variables have been determined, then the composition, cross section and length of the metal tape may be determined routinely by one skilled in the art.

Figure 6:
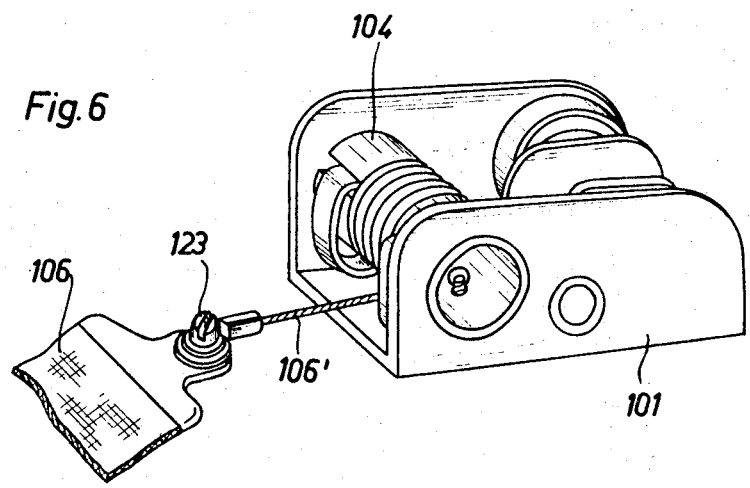
FIG. 6 is a perspective view of a damping member for a safety belt of which the end is formed by a wire rope.

The damping member illustrated in FIG. 6 differs from the above-described embodiment by having a chassis 101 which has been even further reduced in width. For this purpose the belt 106 is provided with an end portion 106' in the form of a wire rope which is wound up on the shaft 104, and which is attached by a screw 123 or equivalent means, possibly detachably, to the belt 106 proper.

It will be understood that the two illustrated embodiments may naturally be provided with a cover or a protective cap, for instance of plastic material. This is not shown in the drawings for the sake of clarity and simplicity.

I claim:

1. A damping device for a vehicle safety belt comprising:
   a. an elongated plastically deformable nonelastic energy absorbing means, at least a part of which is in a coiled configuration constituting a storage coil;
   b. rotatable means for securing one end of said energy absorbing means;
   c. flexible means disposed at one end of the belt and secured to and coiled about said rotatable means; and
   d. a fixed reaction member in contact with a part of said elongated energy absorbing means between said coil and said rotatable means and positioned such that when said elongated flexible means is uncoiled from said rotatable means as a result of a collision the momentum energy of a body retained by said belt is absorbed by a continuous change in the coiled configuration of the energy absorbing means as it is uncoiled, contacts said reaction member and is recoiled about said rotatable means without substantial alteration in the cross section of said energy absorbing means.

2. A damping device as claimed in claim 1 wherein said flexible means is coiled about said rotatable means in a direction opposite to the direction of the turns of said energy absorbing means in said storage coil whereby during a collision said energy absorbing means is coiled about said rotatable means in a direction opposite to the direction of the turns of the storage coil.

3. A damping device as claimed in claim 1 wherein the reaction member is offset on one side of the plane containing the axes of rotation of the storage coil and the rotatable means.

4. A damping device as claimed in claim 1 wherein said fixed reaction member is located at a predetermined distance from the axis of said rotatable means such that as the coil of the energy absorbing means builds up on the rotatable means the reaction member will eventually make contact with the exterior of said coil and act as a brake to reduce the rate of rotation and stop rotation of said rotatable means.

5. A damping device as claimed in claim 1 wherein said elongated energy absorbing means comprises a flat metal tape of varying width along its length.

6. A damping device as claimed in claim 5 wherein the width of said tape is diminished towards the end of the tape in said storage coil.

7. A damping device as claimed in claim 1 comprising two of said elongated plastically deformable nonelastic energy absorbing means.

8. A damping device as claimed in claim 1 further comprising a common chassis for mounting said reaction member and rotatable means and locating the storage coil.

9. A damping device as claimed in claim 7 further comprising a common chassis for mounting said reaction member and rotating means and locating the two storage coils, said flexible means being secured to and coiled about said rotatable means at a location between the locations at which the ends of said energy absorbing means are secured.

10. A damping device as claimed in claim 9 wherein said chassis comprises two pairs of parallel flanges, a storage coil being retained in alignment between each pair.

11. A damping device as claimed in claim 8 wherein said chassis contains an opening to receive said energy absorbing means as it is coiled about said rotatable means during a collision.

12. A damping device as claimed in claim 1 wherein said flexible means comprises one end portion of said belt.

13. A damping device as claimed in claim 1 wherein said flexible means comprises a steel rope.

14. A damping device as claimed in claim 1 wherein said flexible means comprises a steel wire.